United States Patent
Wang et al.

(10) Patent No.: US 10,432,426 B2
(45) Date of Patent: Oct. 1, 2019

(54) PORT MIRRORING IN A VIRTUALIZED COMPUTING ENVIRONMENT

(71) Applicant: Nicira, Inc., Palo Alto, CA (US)

(72) Inventors: Hua Wang, Beijing (CN); Donghai Han, Beijing (CN); Jingchun Jiang, Beijing (CN)

(73) Assignee: NICIRA, INC., Palo Alto, CA (US)

( * ) Notice: Subject to any disclaimer, the term of this patent is extended or adjusted under 35 U.S.C. 154(b) by 187 days.

(21) Appl. No.: 15/437,462

(22) Filed: Feb. 21, 2017

(65) Prior Publication Data

US 2018/0241610 A1  Aug. 23, 2018

(51) Int. Cl.
H04L 12/24 (2006.01)
H04L 12/46 (2006.01)

(52) U.S. Cl.
CPC ...... H04L 12/4633 (2013.01); H04L 41/0806 (2013.01); *H04L 41/046* (2013.01)

(58) Field of Classification Search
None
See application file for complete search history.

(56) References Cited

U.S. PATENT DOCUMENTS

| | | | | |
|---|---|---|---|---|
| 2008/0281699 | A1* | 11/2008 | Whitehead | G06Q 30/02 705/14.41 |
| 2011/0022729 | A1* | 1/2011 | Eisenhauer | H04L 43/0811 709/242 |
| 2014/0280211 | A1* | 9/2014 | Rash | G06F 17/30386 707/748 |
| 2015/0003457 | A1* | 1/2015 | Sugiyama | H04L 45/74 370/392 |
| 2017/0085502 | A1* | 3/2017 | Biruduraju | H04L 49/354 |

* cited by examiner

*Primary Examiner* — Viet D Vu
*Assistant Examiner* — James A Edwards
(74) *Attorney, Agent, or Firm* — Su IP Consulting

(57) ABSTRACT

Example methods are provided for a network management entity to implement port mirroring in a virtualized computing environment. The method may comprise configuring a port mirroring session between a source virtual port and a destination virtual port. A source host may be configured using source session information and a destination host configured using destination session information such that packets passing through the source virtual port are mirrored and sent from the source host to the destination host. The method may also comprise: in response to detecting a status associated with the source virtual port, or the destination virtual port, that requires a reconfiguration of the port mirroring session, generating and send a first instruction to update the source session information at the source host, or a second instruction to update the destination session information at the destination host, or both.

25 Claims, 8 Drawing Sheets

[B] : Packet encapsulated with tunnel header (B)

PORT MIRRORING IN A VIRTUALIZED COMPUTING ENVIRONMENT

BACKGROUND

Unless otherwise indicated herein, the approaches described in this section are not admitted to be prior art by inclusion in this section.

Virtualization allows the abstraction and pooling of hardware resources to support virtual machines in a virtualized computing environment, such as a Software-Defined Data Center (SDDC). For example, through server virtualization, virtual machines running different operating systems may be supported by the same physical machine (e.g., referred to as a "host"). Each virtual machine is generally provisioned with virtual resources to run an operating system and applications. The virtual resources may include central processing unit (CPU) resources, memory resources, storage resources, network resources, etc.

Port mirroring is a switch feature that may be configured between a pair of ports for the purpose of traffic monitoring, analysis, etc. During a port mirroring session, packets passing through one port are mirrored and sent to another port. However, it can be challenging implement port mirroring in a virtualized computing environment.

DETAILED DESCRIPTION

Figure 1:
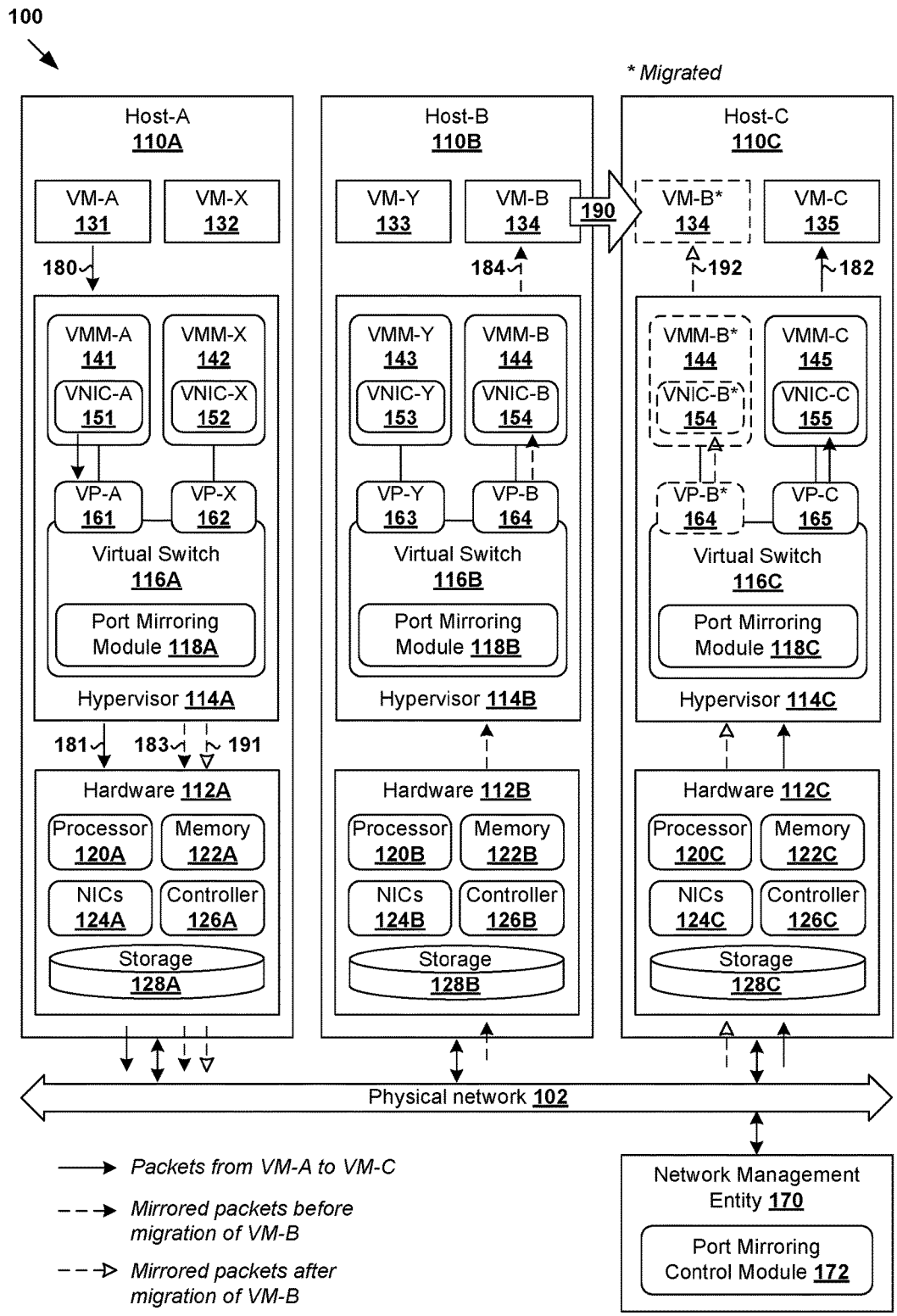
FIG. 1 is a schematic diagram illustrating an example virtualized computing environment in which port mirroring may be implemented.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Challenges relating to implementation of port mirroring will now be explained in more detail using FIG. 1, which is a schematic diagram illustrating example virtualized computing environment 100 in which port mirroring may be implemented. It should be understood that, depending on the desired implementation, virtualized computing environment 100 may include additional and/or alternative components than that shown in FIG. 1.

In the example in FIG. 1, virtualized computing environment 100 includes multiple hosts, such as host-A 110A, host-B 110B and host-C 110C that are connected via physical network 102. Each host 110A/110B/110C includes suitable hardware 112A/112B/112C and virtualization software (e.g., hypervisor 114A/114B/114C) to support virtual machines. For example, host-A 110A supports VM-A 131 and VM-X 132; host-B 110B supports VM-Y 133 and VM-B 134 (shown in full line); and host-C 110C supports VM-C 135. In practice, virtualized computing environment 100 may include any number of hosts (also known as a "computing devices", "host computers", "host devices", "physical servers", "server systems", etc.), where each host may be supporting tens or hundreds of virtual machines.

Although examples of the present disclosure refer to virtual machines, it should be understood that a "virtual machine" running on host 110A/110B/110C is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running on top of a host operating system without the need for a hypervisor or separate operating system such as Docker, etc.; or implemented as an operating system level virtualization), virtual private servers, client computers, etc. The virtual machines may also be complete computational environments, containing virtual equivalents of the hardware and software components of a physical computing system.

Hypervisor 114A/114B/114C maintains a mapping between underlying hardware 112A/112B/112C and virtual resources allocated to respective virtual machines 131-135. Hardware 112A/112B/112C includes suitable physical components, such as central processing unit(s) or processor(s) 120A/120B/120C; memory 122A/122B/122C; physical network interface controllers (NICs) 124A/124B/124C; and storage disk(s) 128A/128B/128C accessible via storage controller(s) 126A/126B/126C, etc. To support guest operating systems and applications, virtual resources are allocated to the virtual machines.

For example, corresponding to hardware 112A/112B/112C, the virtual resources may include virtual CPU, virtual memory, virtual disk, virtual network interface controller (VNIC), etc. Hardware resources may be emulated using virtual machine monitors (VMMs). For example, at host-A 110A, VNIC-A 151 and VNIC-X 152 are emulated by respective VMM-A 141 and VMM-X 142. At host-B 110B, VNIC-Y 153 and VNIC-B 154 are emulated by respective VMM-Y 143 and VMM-B 144, while VNIC-C 155 at host-C 110C is emulated by VMM-C 145. In practice, VMMs 141-145 may be considered as components that are part of respective virtual machines 131-135, or alternatively, separated from virtual machines 131-135.

Hypervisor 114A/114B/114C implements virtual switch 116A/116B/116C to handle both egress traffic (i.e., outgoing or outbound traffic) from, and ingress traffic (i.e., incoming or inbound traffic), to the virtual machines. For example in FIG. 1, virtual switch 116A at host-A 110A handles traffic for VM-A 131 and VM-X 132. As used herein, the term "packets" may refer generally to a group of bits that can be transported together from a source to a destination, such as segments, frames, messages, datagrams, etc. Also, the term "layer 2" may refer generally to a Media Access Control (MAC) layer; and "layer 3" to a network or Internet Protocol (IP) layer in the Open System Interconnection (OSI) model, although the concepts described herein may be used with other networking models. Physical network 102 may include any suitable number of interconnected network devices, such as layer-3 routers, layer-2 switches, gateway devices, etc.

Each virtual switch 116A/116B/116C is generally a logical collection of virtual ports that are each logically associated with a VNIC. For example in FIG. 1, at host-A 110A, virtual switch 116A is a logical collection of VP-A 161 and VP-X 162 associated with respective VNIC-A 151 and VNIC-X 152. Similarly, at host-B 110B, virtual switch 116B is a logical collection of VP-Y 163 and VP-B 164 associated with respective VNIC-Y 153 and VNIC-B 154. Further, at host-C 110C, VP-C 165 is associated with VNIC-C 155. Each virtual switch 116A/116B/116C maintains forwarding information to forward packets to and from the corresponding VNICs.

In virtualized computing environment 100, port mirroring may be configured between a pair of virtual ports for the purpose of traffic monitoring, analysis, debugging, network diagnostics, etc. In the example in FIG. 1, consider the communication between VM-A 131 at host-A 110A and VM-C 135 at host-C 110C. At host-A 110A, virtual switch 116A detects egress packets (see 180 in FIG. 1) from VM-A 131 and forwards the egress packets (see 181 in FIG. 1) to host-C 110C via physical network 102. At host-C 110C, virtual switch 116C receives and forwards the packets (see 182 in FIG. 1) to VP-C 165 and VM-C 135. To provide visibility into the communication between VM-A 131 and VM-C 155, a port mirroring session may be configured between source virtual port=VP-A 161 and destination virtual port=VP-B 164 such that VP-B 164 also receives a copy of the egress packets passing through VP-A 161.

During a port mirroring session, virtual switch 116A at source host-A 110A mirrors (i.e., makes a copy of) the egress packets passing through VP-A 161, and sends the mirrored packets (see dotted arrow 183 in FIG. 1) to host-B 110B. At the port mirroring destination host-B 110B, virtual switch 116B receives and forwards the mirrored packets (see 184 in FIG. 1) to VP-B 164 and VM-B 134. At VM-B 134, any suitable application(s) may be used to analyze the mirrored packets, such as to collect statistics, debug data, diagnose errors, etc.

In practice, port mirroring may be configured using network management entity 170, such as a network virtualization controller (e.g., software defined network (SDN) controller) on a central control plane in a data center. In practice, the network virtualization controller may be the NSX controller component of VMware NSX®, available from VMware, Inc. The NSX controller may control, among other things, port mirroring configuration for a cluster of hosts under the management of a network virtualization manager (e.g., NSX manager). Through network virtualization, benefits similar to server virtualization may be derived for networking services in the virtualized computing environment. For example, logical networks may be provisioned, changed, stored, deleted and restored programmatically without having to reconfigure the underlying physical hardware. Network management entity 170 may be implemented using physical machine(s), virtual machine(s), or both.

Conventionally, a port mirroring session generally lacks adaptability after the initial configuration by a user (e.g., network administrator). In some scenarios, this often necessitates manual intervention by the user when the port mirroring session needs to be updated. In the example in FIG. 1, VM-B 134 associated with destination virtual port VP-B 164 may be migrated (see 190 in FIG. 1) from host-B 110B to host-C 110C. After the migration, however, the port mirroring session between VP-A 161 and VP-B 164 will no longer be operational. This is because mirrored packets sent from host-A 110A to host-B 110B will not reach VP-B 164 after the migration to host-C 110C. In this case, it is necessary for the network administrator to identify the problem, and manually reconfigure host-A 110A to send the mirrored packets to host-C 110C. Unfortunately, the conventional approach is inefficient and lacks scalability, especially when there are many port mirroring sessions configured in virtualized computing environment 100.

Port Mirroring Reconfiguration

According to examples of the present disclosure, a port mirroring session may be automatically and dynamically reconfigured based on a status of the source virtual port or destination virtual port. This way, the need for manual intervention by the network administrator reduced, if not avoided, to improve performance and usability. In the following, VP-A 161 will be used as an example "source virtual port," VP-B 164 as an example "destination virtual port," VM-B 134 as an example "destination virtualized computing instance," host-A 110A as a "source host," host-B 110B as a "destination host" or "first destination host," and host-C 110C as a "second destination host."

Figure 2:
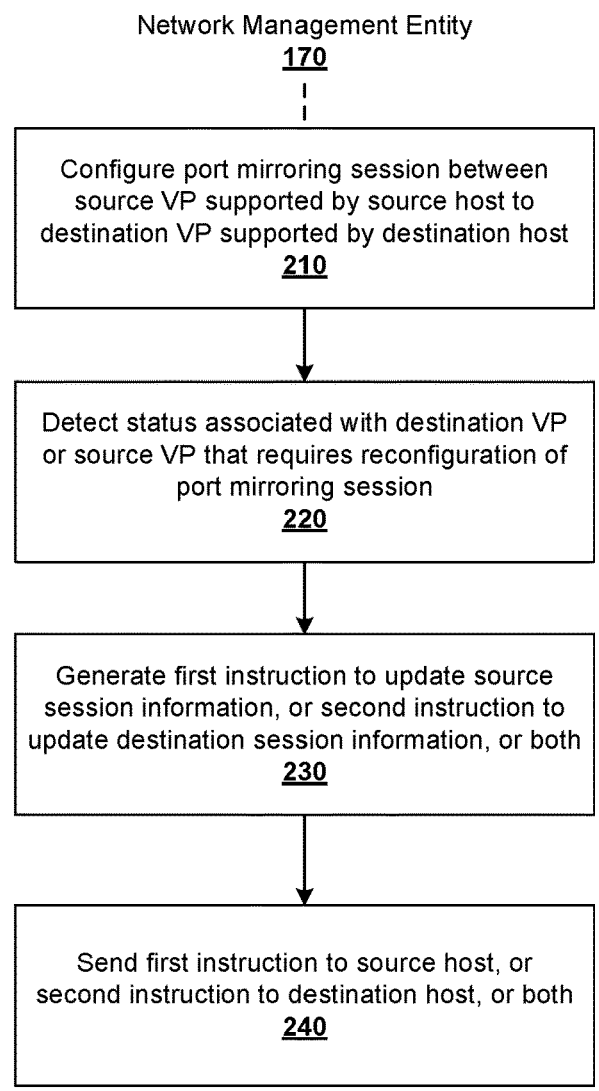
FIG. 2 is a flowchart of an example process for a network management entity to implement port mirroring in a virtualized computing environment.

In more detail, FIG. 2 is a flowchart of an example process 200 for network management entity 170 to implement port mirroring in virtualized computing environment 100. Example process 200 may include one or more operations, functions, or actions illustrated by one or more blocks, such as 210 to 240. The various blocks may be combined into fewer blocks, divided into additional blocks, and/or eliminated depending on the desired implementation. Example process 200 may be implemented by network management entity 170, such as using port mirroring control module 172 or any additional or alternative module. At host 110A/110B/110C, port mirroring may be implemented under the control of network management entity 170, such as using virtual switch 116A/116B/116C and more particularly port mirroring module 118A/118B/118C.

At 210 in FIG. 2, network management entity 170 configures a port mirroring session between source virtual port VP-A 161 associated with source host-A 110A and destination virtual port VP-B 164 associated with destination host-B 110B. Source host-A 110A is configured using source session information and destination host-B 110B using destination session information such that packets passing through source VP-A 161 are mirrored and sent from host-A 110A to host-B 110B.

As will be further described below, the source session information may include a session identifier (ID) of the port mirroring session and a destination virtual tunnel endpoint (VTEP) address associated with destination host-B 110B. The destination session information may include the session ID and a source VTEP address associated with source host-A 110A.

At 220 in FIG. 2, network management entity 170 detects a status associated with source VP-A 161 or destination virtual port VP-B 164 that requires a reconfiguration of the port mirroring session. At 230 and 240 in FIG. 2, based on the detected status, network management entity 170 generates and sends a first instruction to update the source session information at source host-A 110A, or a second instruction to update the destination session information at destination host-B 110B, or both. Here, the term "update" may refer generally to any modification (e.g., replacing the value of a parameter, adding a parameter, removing a parameter) of the session information, removal of the session information, etc.

In a first example that will be explained further using FIG. 3 to FIG. 5B, the detected status may be migration of VM-B 134 associated with VP-B 164 from host-B 110B ("first destination host") to host-C 110C ("second destination host"). In this case, in response to detecting the migration, the source session information at host-A 110A may be updated to include a destination VTEP address associated with host-C 110C. This way, after the migration, the port mirroring session is dynamically reconfigured to send mirrored packets from host-A 110A to host-C 110C (see 191 and 192 in FIG. 1) instead of host-B 110B.

In a second example that will be explained further using FIG. 6 to FIG. 8B, the detected status may be inactivity of destination port VP-B 164, such as when associated VM-B 134 is powered off, etc. In this case, in response to detecting the inactivity status, network management entity 170 may instruct source host-A 110A to remove the source session information or set a flag associated with the source session information such that the port mirroring session is disabled at the source host. Depending on the desired implementation, destination host-B 110B may also be instructed to remove the destination session information, or set a flag associated with the destination session information such that the port mirroring session is disabled at the destination host. This way, the port mirroring session may be disabled to reduce resource wastage.

It should be understood that examples of the present disclosure may be applied to any suitable "status" associated with the source virtual port or destination virtual port that is detectable by network management entity 170. Using example process 200, network management entity 170 may reconfigure the port mirroring session based on the detected status in a more efficient and scalable manner.

FIRST EXAMPLE

Migration

Figure 3:
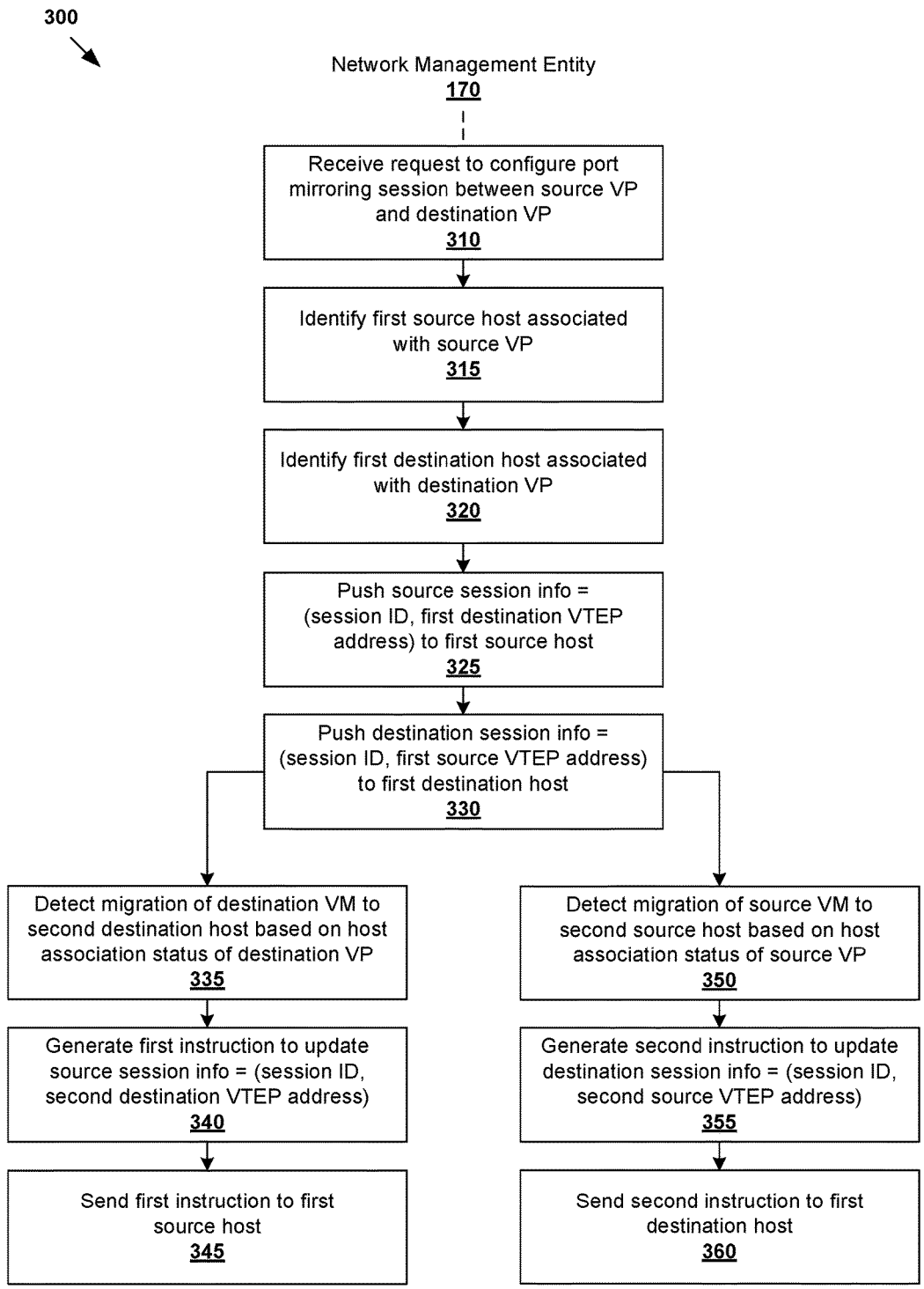
FIG. 3 is a flowchart of a detailed process for a network management entity to implement port mirroring in a virtualized computing environment according to a first example.

FIG. 3 is a flowchart of detailed process 300 for network management entity 170 to implement port mirroring in virtualized computing environment 100 according to a first example. Example process 300 may include one or more operations, functions, or actions illustrated by one or more blocks, such as 310 to 360. The various blocks may be combined into fewer blocks, divided into additional blocks, and/or eliminated depending on the desired implementation. Similar to the example in FIG. 2, example process 300 may be performed by network management entity 170 using any suitable module(s), such as port mirroring control module 172, etc.

At 310 in FIG. 3, network management entity 170 receives an instruction to configure a port mirroring session, such as from a network virtualization manager (e.g., NSX manager). In practice, the configuration may be initiated by a user (e.g., network administrator), such as through an interface provided by the network virtualization manager, etc. The interface may be a graphical user interface (GUI), command line interface (CLI), etc. The port mirroring session may be associated a session ID, source virtual port, destination virtual port, type of packets to be mirrored (e.g., ingress and/or egress), etc.

In the example in FIG. 1, the port mirroring session being configured is between source virtual port=VP-A 161 and destination virtual port=VP-B 164. The packets to be mirrored may be egress packets from VM-A 131 (as shown in FIG. 1), ingress packets destined for VM-A 131 (not shown for simplicity), or both. In practice, a port mirroring session may involve a set of multiple source virtual ports, and/or a set of multiple destination virtual ports.

At 315 and 320 in FIG. 3, network management entity 170 identifies a source host associated with the source virtual port, and a destination host associated with the destination virtual port. In one example, to identify the hosts, network management entity 170 may learn host association status of each virtual port that maps or associates it to a particular host 110A/110B/110C.

Figure 4A:
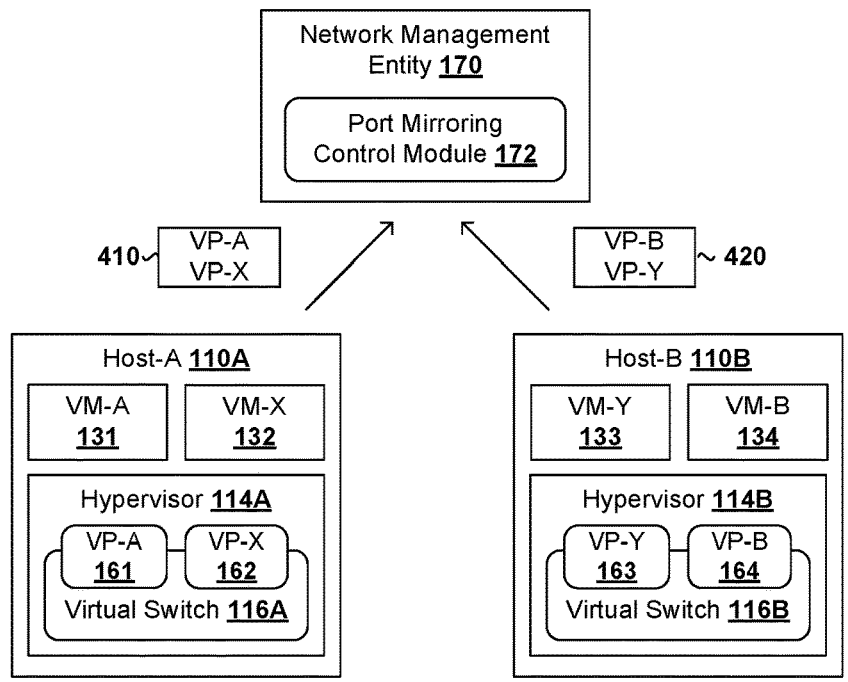
FIG. 4A is a schematic diagram illustrating a network management entity learning host association status information according to the example in FIG. 3.

FIG. 4A is a schematic diagram illustrating network management entity 170 learning host association status information according to the example in FIG. 3. In particular, network management entity 170 receives a first report message (see 410 in FIG. 4A) from host-A 110A that reports its association with VP-A 161 and VP-X 162. Similarly, network management entity 170 receives a second report message (see 420 in FIG. 4A) from host-B 110B that reports its association with VP-Y 163 and VP-B 164. Based on the report messages, the following host association statuses may be learned: (host-A, VP-A), (host-A, VP-X), (host-B, VP-Y) and (host-B, VP-B).

Although not shown in FIG. 4A for simplicity, network management entity 170 may receive a third report message from host-C 110C to learn (host-C, VP-C). This way, network management entity 170 is able to keep track of the status of all virtual ports, including their host association (i.e., location), whether they are active, etc. During the configuration process of a port mirroring session, network management entity 170 may identify source host=host-A 110A associated with source virtual port=VP-A 161 based on host association status=(host-A, VP-A). Similarly, destination host=host-B 110B associated with destination virtual port=VP-B 164 may be identified based on host association status=(host-B, VP-B).

Figure 4B:
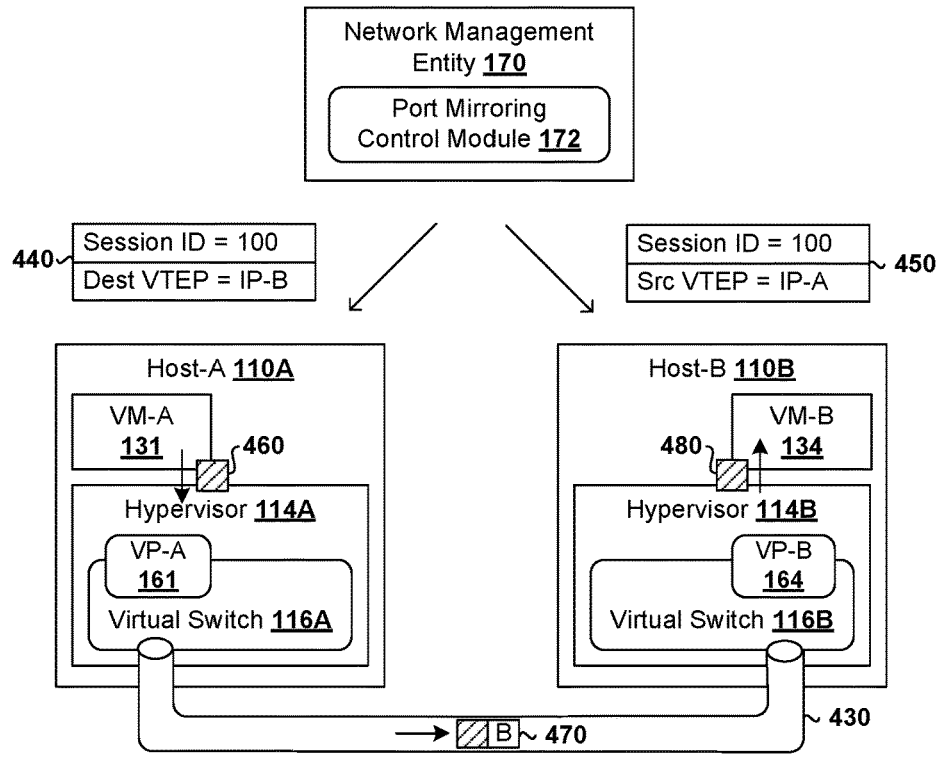
FIG. 4B is a schematic diagram illustrating a network management entity configuring a port mirroring session according to the example in FIG. 3.

At 325 and 330 in FIG. 3, network management entity 170 configures the port mirroring session by sending or pushing source session information to the source host and destination session information to the destination host. An example is shown in FIG. 4B, which is a schematic diagram illustrating network management entity 170 configuring a port mirroring session according to the example in FIG. 3. In this example Encapsulated Remote Switched Port Analyzer (ER-SPAN) may be used to establish the port mirroring session between VP-A 161 and VP-B 164. Compared to other technologies such as Switched Port Analyzer (SPAN) and Remote Switched Port Analyzer (RSPAN), ERSPAN is able to support port mirroring among arbitrary virtual ports that may be supported by different virtual switches on different hosts.

Using ERSPAN, a port mirroring tunnel (see 430 in FIG. 4B) is established between host-A 110A and host-B 110B, and particularly between source VTEP=virtual switch 116A at host-A 110A and destination VTEP=virtual switch 116B. Here, the term "tunnel" may generally refer to an end-to-end, bi-directional communication path between a pair of VTEPs. The term "port mirroring tunnel" may generally refer to a tunnel that is established for a port mirroring session. Any suitable tunneling protocol may be used, such as Virtual eXtension Local Area Network (VXLAN), Generic Routing Encapsulation (GRE), etc.

To configure the port mirroring session, source session information (see 440 in FIG. 4B) is pushed to source host-A 110A, and destination session information (see 450 in FIG. 4B) to destination host-B 110B. Source session information 440 includes a session ID=100, and a destination VTEP address=IP-B associated with destination host-B 110B. Destination session information 450 includes session ID=100, and a source VTEP address=IP-A associated with source host-A 110A. The session ID is used to uniquely identify the port mirroring session. The source and destination VTEP addresses identify respective source VTEP=virtual switch 116A and destination VTEP=virtual switch 116B.

During the port mirroring session, in response to detecting egress packets (see 460 in FIG. 4B) passing through VP-A 161, virtual switch 116A at host-A 110A encapsulates egress packets 460 based on source session information 440 from network management entity 170. For example, encapsulated packets (see 470 in FIG. 4B) includes a tunnel header labelled "B" that identifies session ID=100, source VTEP address=IP-A, and destination VTEP address=IP-B. Host-A 110A then sends encapsulated packets 470 to host-B 110B via port mirroring tunnel 430. Note that the tunnel header serves as an outer header of the encapsulated packets, which also have an inner header identifying the packet source (e.g., VM-A 131) and destination (e.g., VM-C 135 at host-C 110C) and payload information.

At host-B 110B, in response to receiving the encapsulated packets, virtual switch 116B performs decapsulation to remove the tunnel header. The decapsulated packets (see 480 in FIG. 4B) are then sent to destination virtual port=VP-B 164 and subsequently VM-B 134. It should be understood that decapsulated packets 480 received by VM-B 134 are mirrored packets. This means that host-A 110A also sends egress packets 460 to their original destination, such as VM-C 135 at host-C 110C (not shown in FIG. 4B for simplicity).

In practice, there are various scenarios in which a virtual machine associated with a port mirroring session may be migrated from one host to another host. For example in FIG. 4B, migration of VM-B 134 may be initiated for load balancing purposes to reduce the workload at host-B 110B. The aim is to improve the overall resource utilization in virtualized computing environment 100. In another example, VM-B 134 may be migrated as part of a fault tolerance mechanism, such as when there is a failure at host-B 110B.

However, once VM-B 134 is migrated to host-C 110C, the original port mirroring path from VP-A 161 to VP-B 164 becomes invalid. This is because host-A 110A still sees VP-B 164 on host-B 110B, and mirrored packets cannot be delivered to VM-B 134 on host-C 110C using destination VTEP address=IP-B. In this case, port mirroring tunnel 430 is considered to be broken. According to examples of the present disclosure, the port mirroring session in FIG. 4B may be automatically reconfigured to deliver mirrored packets from host-A 110A to host-C 110C instead of host-B 110B. This should be contrasted against conventional approaches that require a network administrator to fix the broken tunnel manually.

Referring to FIG. 3 again, at 335, network management entity 170 detects a migration of a destination virtual machine associated with a destination virtual port for which a port mirroring session is configured. The migration from a first destination host to a second destination host may be detected based on report messages from respective destination hosts. An example will be explained using FIG. 5A, which is a schematic diagram illustrating network management entity 170 detecting a migration of destination virtualized computing instance 134 according to the example in FIGS. 3.

Figure 5A:
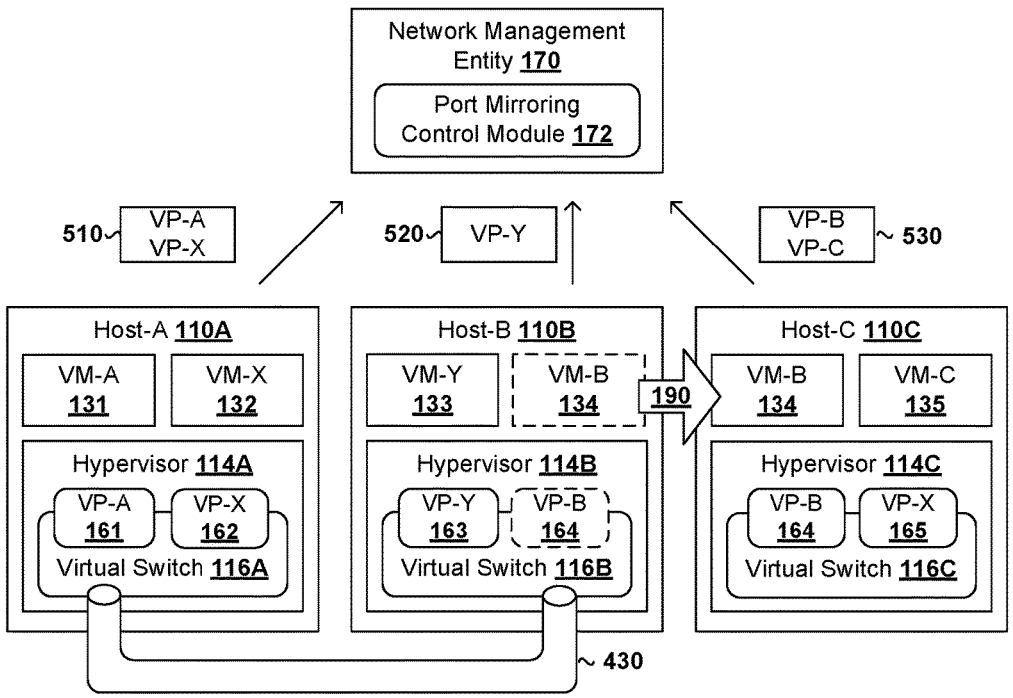
FIG. 5A is a schematic diagram illustrating a network management entity detecting a migration of a destination virtualized computing instance according to the example in FIG. 3.

In the example in FIG. 5A, network management entity 170 receives report messages from respective host-A 110A (see 510), host-B 110B (see 520) and host-C 110C (see 530). Based on report message 520 from host-B 110B and report message 530 from host-C 110C, network management entity 170 detects a change in the host association status of VP-B 164 from (host-B, VP-B) in FIG. 4A and FIG. 4B to (host-C, VP-B) in FIG. 5A. The change indicates to network management entity 170 that there has been a migration of VM-B 134 associated with VP-B 164 from host-B 110B to host-C 110C (see 190 in FIG. 5A).

At 340 and 345 in FIG. 3, in response to detecting the migration, network management entity 170 generates and sends an instruction for the source host to update the source session information. An example is shown in FIG. 5B, which is a schematic diagram illustrating network management entity 170 reconfiguring a port mirroring session according to the example in FIG. 3.

Figure 5B:
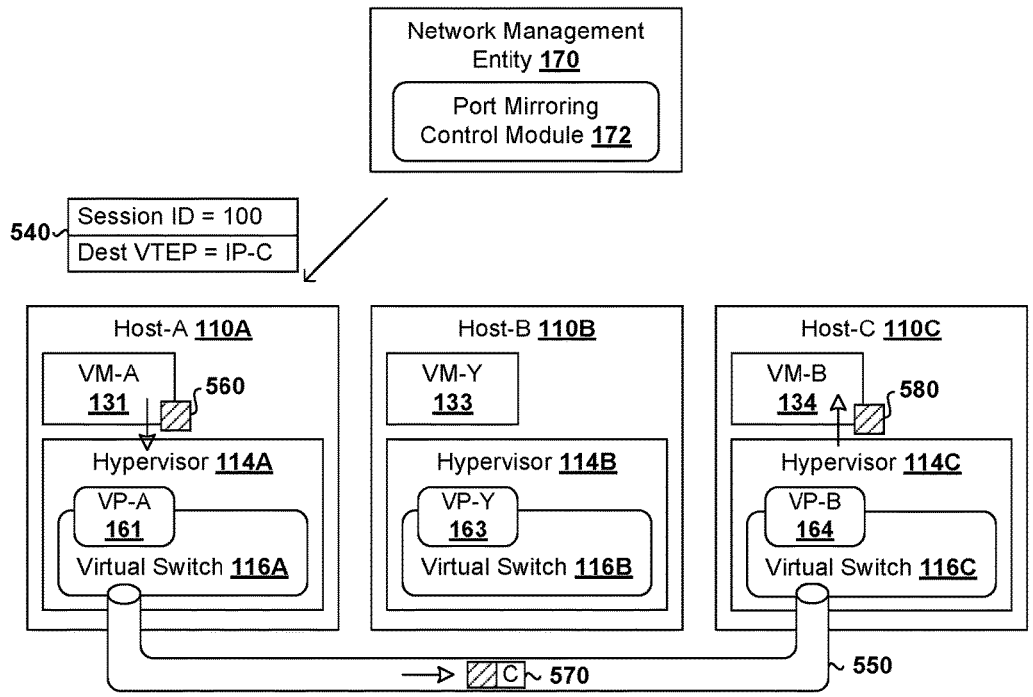
FIG. 5B is a schematic diagram illustrating a network management entity reconfiguring a port mirroring session according to the example in FIG. 3.

In the example in FIG. 5B, network management entity 170 reconfigures the port mirroring session by generating and sending an instruction (see 540 in FIG. 5B) to host-A 110A to update its source session information to include session ID=100 and destination VTEP address=IP-C associated with host-C 110C (i.e., replacing IP-B with IP-C). Note that the VTEP address information of each host 110A/110B/110C may be stored in any suitable storage accessible by network management entity 170. The destination session information generally does not need to be updated because it will be migrated along with VM-B 134. In practice, such migration may be supported by a distributed virtual switch (DVS) spanning multiple hosts 110A-110C, such as using VMware's vSphere® Distributed Switch™ (VDS) technology, etc.

After the reconfiguration, packets passing through source virtual port=VP-A 161 at host-A 110A are sent to host-C 110C via a port mirroring tunnel (see 550 in FIG. 5B) between source VTEP=virtual switch 116A at host-A 110A and destination VTEP=virtual switch 116C at host-C 110C. In response to detecting egress packets (see 560 in FIG. 5B) passing through VP-A 161, virtual switch 116A at host-A 110A encapsulates egress packets 560 based on updated source session information 540 from network management entity 170.

Encapsulated packets (see 570 in FIG. 5B) includes a tunnel header labelled "C" that identifies session ID=100, source VTEP address=IP-A, and destination VTEP address=IP-C. Encapsulated packets 570 are then sent from host-A 110A via port mirroring tunnel 550 to host-C 110C. In response to receiving encapsulated packets 570, virtual switch 116C at host-C 110C performs decapsulation to remove the tunnel header before sending the decapsulated packets (see 580 in FIG. 5B) to VP-B 164 and subsequently VM-B 134.

In another example, source virtual port=VP-A 161 may be moved from source host=host-A 110A to another host, such as to host-D (not shown for simplicity). In some cases, it may not be necessary to inform destination host-C 110C associated with destination virtual port=VP-B 164 that VP-A 161 has been moved. The port mirroring session should be able to operate as usual because updated source session information=(session ID=100, IP-C) will be migrated along with VP-A 161. However, for security reasons, host-C 110C supporting VP-B 164 may be informed of the migration to update its destination session information such that host-C 110C is able to identify and verify the port mirroring source.

Referring to FIG. 3 again, at 350, network management entity 170 may detect the migration based on a report message from host-A 110A ("first source host") that it is no longer associated with of VP-A 161. Further, based on another report message from host-D ("second source host"), network management entity 170 detects a change in the host association status from (host-A, VP-A) to (host-D, VP-A). The change indicates that VP-A 161 has been moved from host-A 110A to host-D, which has a different source VTEP address=IP-D.

At 355 and 360 in FIG. 3, network management entity 170 generates and sends a second instruction to destination host-C 110C supporting VP-B 164 to update its destination session information to (session ID=100, IP-D). When mirrored packets are received from host-D, host-C 110C (e.g., using a firewall engine) may verify that the source VTEP address in the mirrored packets matches with IP-D in the destination session information before passing them to VP-B 164. This way, host-C 110C is able to verify host-D based on the source VTEP address as a protection mechanism against security threats caused by unwanted packets.

SECOND EXAMPLE

Inactivity

In the above examples, it is assumed that source and destination virtual ports involved in a port mirroring session are active when the source session information is pushed to the source host and destination session information to the destination host. In practice, however, this assumption might not be always true. For example, the destination virtual port may become inactive when its associated virtual machine is powered off, etc. In this case, the source host should stop sending mirrored packets to the destination host.

According to examples of the present disclosure, resource wastage may be reduced through automatic configuration and reconfiguration of a port mirroring session depending on whether the associated virtual ports are active or inactive. This reduces resource wastage at the source host to generate and send mirrored packets. Further, network resources of physical network 102 may be better utilized to send other more important packets, instead of the unwanted mirrored packets.

Figure 6:
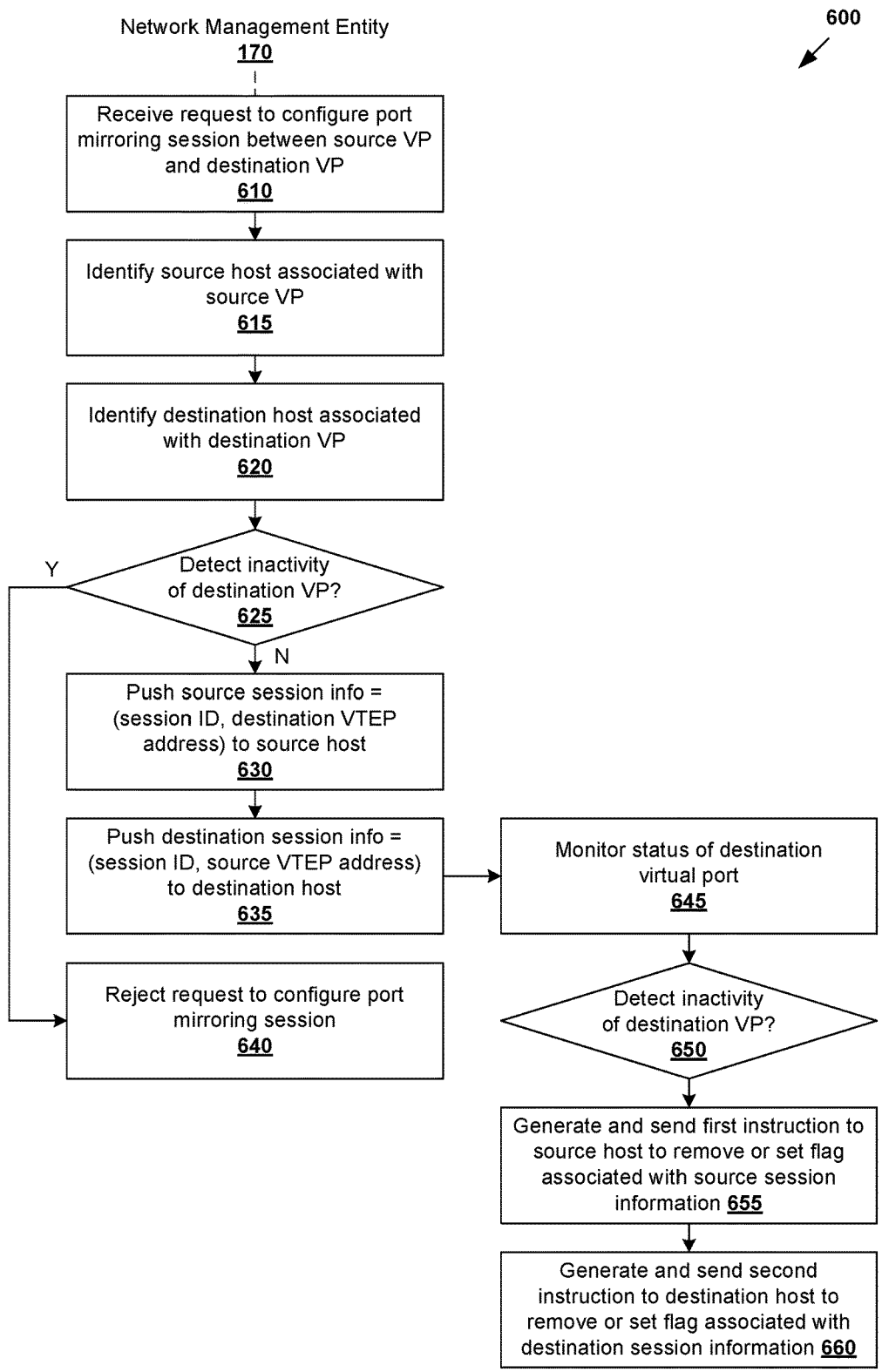
FIG. 6 is a flowchart of a detailed process for a network management entity to implement port mirroring in a virtualized computing environment according to a second example.

FIG. 6 is a flowchart of detailed process 600 for network management entity 170 to implement port mirroring in virtualized computing environment 100 according to a second example. Example process 600 may include one or more operations, functions, or actions illustrated by one or more blocks, such as 610 to 660. The various blocks may be combined into fewer blocks, divided into additional blocks, and/or eliminated depending on the desired implementation. Example process 600 may be performed by network management entity 170 using any suitable module(s), such as port mirroring control module 172, etc. It should be understood that example process 600 may be implemented together with the example in FIGS. 3.

Blocks 610, 615, 620, 630 and 635 in FIG. 6 are similar to corresponding blocks 310, 315, 320, 325 and 330 in FIG. 3. Additionally, at 625 in FIG. 6, prior to pushing the source session information to the source host and destination session information to the destination host, network management entity 170 detects whether the destination virtual port is associated with status=inactive. If both virtual ports are active, at 630 and 635 in FIG. 6, network management entity 170 proceeds with the configuration similar to the example in FIG. 3. Otherwise, at 640 in FIG. 6, the request to configure the port mirroring session is rejected because the destination virtual port is detected to be inactive.

Further, at 645 in FIG. 6, continues to monitor the inactivity status of the destination virtual port. At 650, 655 and 660 in FIG. 6, if the destination virtual port is detected to be inactive, network management entity 170 generates and sends an instruction to the corresponding source host and destination host to disable the port mirroring session. For example, each source/destination host is instructed to remove its source/destination session information, or to set a flag associated with the source/destination session information to indicate that the port mirroring session is disabled. Several examples are discussed below.

Figure 7:
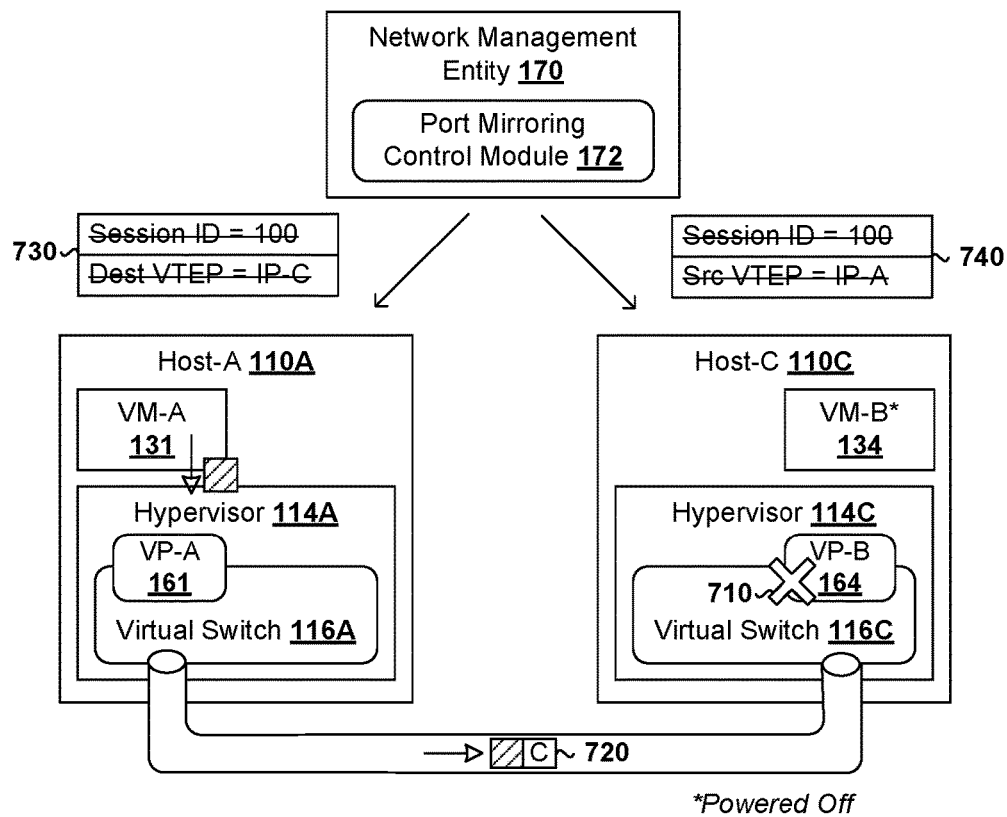
FIG. 7 is a schematic diagram illustrating a network management entity reconfiguring a port mirroring session after a destination virtual port becomes inactive according to the example in FIG. 6.

In a first example, FIG. 7 is a schematic diagram illustrating network management entity 170 reconfiguring a port mirroring session after destination virtual port 164 becomes inactive according to the example in FIG. 6. Continuing from the example in FIG. 5B (i.e., after VM-B 134 is migrated to host-C 110C), the status of destination virtual port=VP-B 164 may change from active to inactive (see 710 in FIG. 7), such as when VM-B 134 is powered off. In this case, any mirrored packets (see 720 in FIG. 7) sent from source host-A 110A will be discarded by host-C 110C.

To reduce resource wastage, network management entity 170 generates and sends a first instruction to source host-A 110A to remove or set a flag associated with its source session information (100, IP-C); see 730 in FIG. 7. This way, the port mirroring session is disabled at source host-A 110A, which will stop sending mirrored packets to host-C 110C. Once the port mirroring session is disabled at the source host, resource wastage at the destination host should be minimal because no mirrored packets will be received. Depending on the desired implementation, the port mirroring session may also be disabled at host-C 110C. In this case, network management entity 170 further generates and sends a second instruction to host-C 110C to remove its destination session information (session ID=100, IP-A) or set an associated flag such that the port mirroring session is disabled; see 740 in FIG. 7.

Figure 8A:
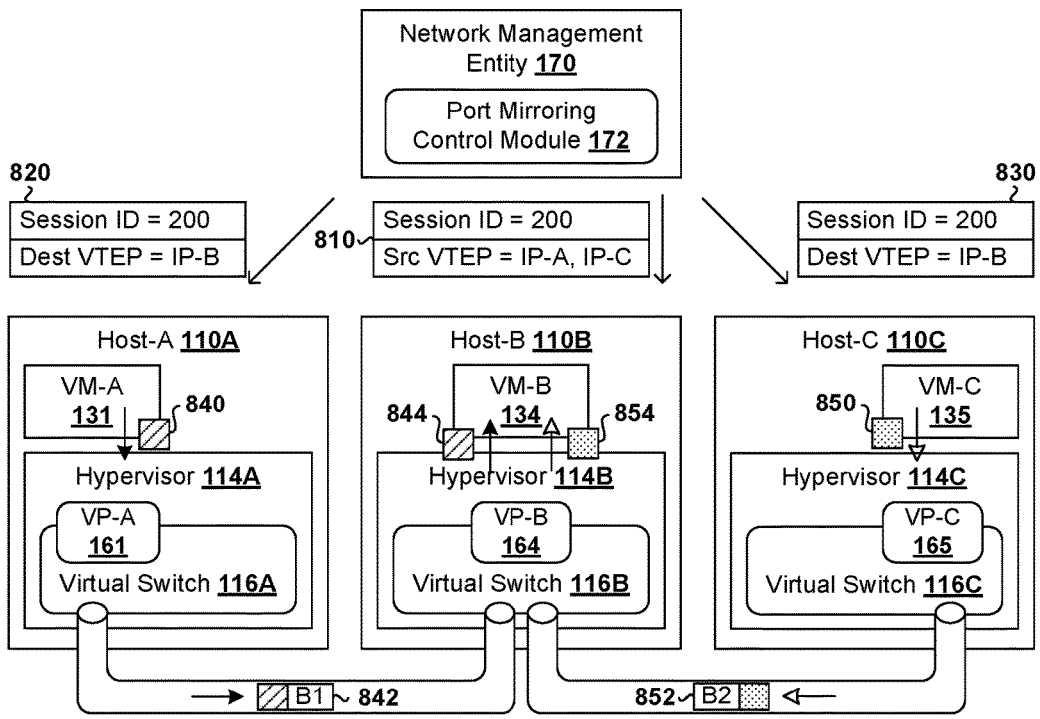
FIG. 8A is a schematic diagram illustrating a network management entity reconfiguring a port mirroring session between multiple source virtual ports and one destination virtual port according to the example in FIG. 6.

In a second example, FIG. 8A is a schematic diagram illustrating network management entity 170 reconfiguring a port mirroring session between multiple source virtual ports 161, 165 and one destination virtual port 164 according to the example in FIG. 6. In this example, both VP-A 161 and VP-C 165 at host-C 110C are configured as source virtual ports such that packets passing through any of them are mirrored and sent to destination virtual port=VP-B 164.

To configure the port mirroring session, destination session information (session ID=200; source VTEP addresses=IP-A, IP-C) is sent to destination host-B 110B (see 810 in FIG. 8A). Further, source session information (session ID=200, destination VTEP address=IP-B) is sent to both host-A 110A (see 810 in FIG. 8A) and host-C 110C (see 830 in FIG. 8A). During the port mirroring session, packets passing through VP-A 161 are mirrored and encapsulated with a tunnel header labelled "B1" (see 840, 842 in FIG. 8A). Similarly, packets passing through VP-C 165 are mirrored and encapsulated with a tunnel header labelled "B2" (see 850, 852 in FIG. 8A). The encapsulation is performed based on the destination session information. At host-B 110B, the encapsulated packets are received, decapsulated and sent to destination VP-B 164 and VM-B 134 (see 844, 854 in FIG. 8A).

Figure 8B:
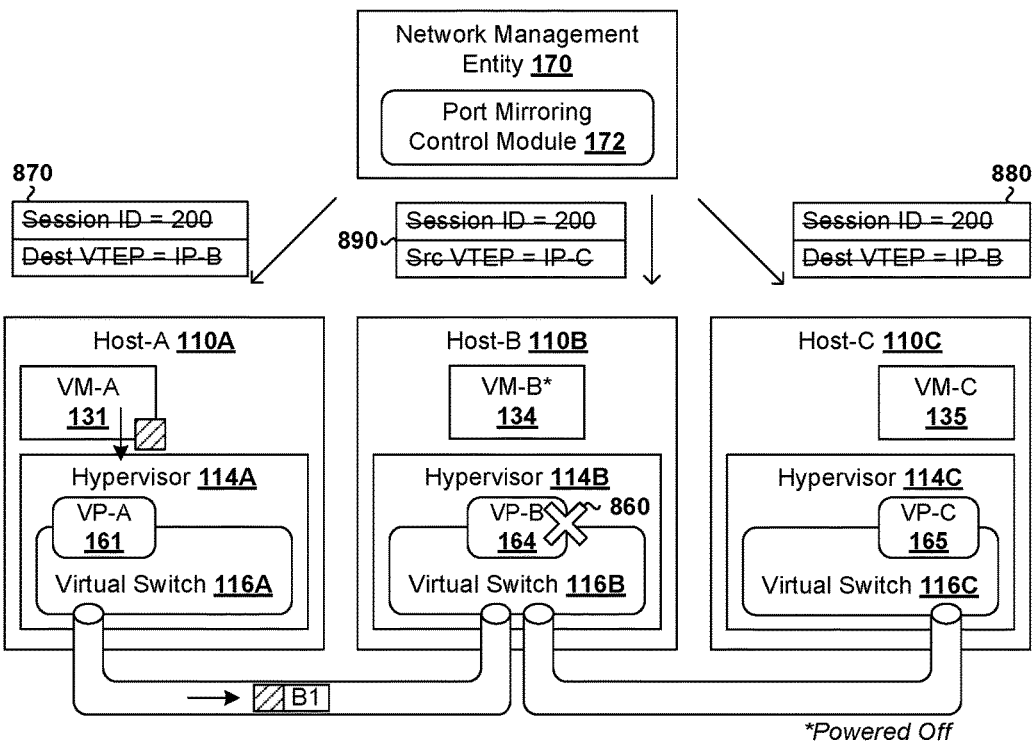
FIG. 8B is a schematic diagram illustrating a network management entity reconfiguring the port mirroring session in FIG. 8A after a destination virtual port becomes inactive.

FIG. 8B is a schematic diagram illustrating network management entity 170 reconfiguring the port mirroring session in FIG. 8A after a destination virtual port becomes inactive. In this example, if destination virtual port=VP-B 164 becomes inactive, both host-A 110A and host-C 110C should stop sending port mirroring traffic to host-B 110B. In this case, both host-A 110A and host-C 110C will be instructed to remove source session information (session ID=200, destination VTEP address=IP-B), or set a flag associated with the source session information such that the port mirroring session is disabled. See first instruction 870 to host-A 110A and second instruction 880 to host-C 110C in FIG. 8B. Depending on the desired implementation, host-B 110B may also be instructed to remove its destination session information, or set an associated flag such that the port mirroring session is disabled at the destination host. See third instruction 890 to host-B 110B in FIG. 8B.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform processes described herein with reference to FIG. 1 to FIG. 8B. For example, a computer system capable of acting as network management entity 170 or host 110A/110B/110C may be deployed in virtualized computing environment 100.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method for a network management entity to implement port mirroring in a virtualized computing environment that includes the network management entity, a source host and a destination host, wherein the method comprises:

configuring a port mirroring session between a source virtual port associated with a source virtualized computing instance supported by the source host and a destination virtual port associated with a destination virtualized computing instance supported by the destination host, wherein the source host is configured using source session information with at least a first destination virtual tunnel endpoint (VTEP) address for the port mirroring session and the destination host is configured using destination session information with at least a first source VTEP address for the port mirroring session such that packets passing through the source virtual port are mirrored and sent from the source host to the destination host, and each mirrored packet in the port mirroring session includes an outer header identifying the source session information and the destination session information and an inner header identifying the source virtualized computing instance and the destination virtualized computing instance; and in response to detecting a status associated with the source virtual port, or the destination virtual port, that requires a reconfiguration of the port mirroring session,
based on the detected status, generating a first instruction to update the source session information at the source host, or a second instruction to update the destination session information at the destination host, or both; and sending the first instruction to the source host, or the second instruction to the destination host, or both.

2. The method of claim 1, wherein detecting the status comprises:
   detecting a migration of the destination virtualized computing instance associated with the destination virtual port from the destination host, being a first destination host, to a second destination host.

3. The method of claim 2, wherein generating the first instruction comprises:
   generating the first instruction to update the source session information to replace the first destination VTEP address with a second destination VTEP address associated with the second destination host such that mirrored packets are sent from the source host to the second destination host based on the second destination VTEP address.

4. The method of claim 1, wherein detecting the status comprises:
   detecting a migration of the source virtualized computing instance associated with the source virtual port from the source host, being a first source host, to a second source host.

5. The method of claim 4, wherein generating the second instruction comprises:
   generating the second instruction to update the destination session information to replace the first source VTEP address with a second source VTEP address associated with the second source host such that the destination host is able to verify the second source host based on the second source VTEP address.

6. The method of claim 1, wherein detecting the status comprises at least one of the following:
   detecting a change in a host association status of the source virtual port that indicates a migration of the source virtualized computing instance associated with the source virtual port; and
   detecting a change in a host association status of the destination virtual port that indicates a migration of the destination virtualized computing instance associated with the destination virtual port.

7. The method of claim 1, wherein detecting the status comprises:
   detecting an inactivity status of the destination virtual port.

8. The method of claim 7, wherein the method comprises one or more of the following:
   generating the first instruction to remove the source session information or set a flag associated with the source session information such that the port mirroring session is disabled at the source host; and
   generating the second instruction to remove the destination session information or set a flag associated with the destination source session information such that the port mirroring session is disabled at the destination host.

9. The method of claim 1, wherein the method further comprises learning a first association of the source host with one or more virtual ports on the source host from the source host and a second association of the destination host with one or more virtual ports on the destination host from the destination host.

10. A non-transitory computer-readable storage medium that includes a set of instructions which, in response to execution by a processor of a computer system, cause the processor to implement a method of port mirroring in a virtualized computing environment that includes a source host and a destination host, wherein the method comprises:
    configuring a port mirroring session between a source virtual port associated with a source virtualized computing instance supported by the source host and a destination virtual port associated with a destination virtualized computing instance supported by the destination host, wherein the source host is configured using source session information with at least a first destination virtual tunnel endpoint (VTEP) address for the port mirroring session and the destination host is configured using destination session information with at least a first source VTEP address for the port mirroring session such that packets passing through the source virtual port are mirrored and sent from the source host to the destination host, and each mirrored packet in the port mirroring session includes an outer header identifying the source session information and the destination session information and an inner header identifying the source virtualized computing instance and the destination virtualized computing instance; and
    in response to detecting a status associated with the source virtual port, or the destination virtual port, that requires a reconfiguration of the port mirroring session,
        based on the detected status, generating a first instruction to update the source session information at the source host, or a second instruction to update the destination session information at the destination host, or both; and
        sending the first instruction to the source host, or the second instruction to the destination host, or both.

11. The non-transitory computer-readable storage medium of claim 10, wherein detecting the status comprises:
    detecting a migration of the destination virtualized computing instance associated with the destination virtual port from the destination host, being a first destination host, to a second destination host.

12. The non-transitory computer-readable storage medium of claim 11, wherein generating the first instruction comprises:
    generating the first instruction to update the source session information to replace the first destination VTEP address with a second destination VTEP address associated with the second destination host such that mirrored packets are sent from the source host to the second destination host based on the second destination VTEP address.

13. The non-transitory computer-readable storage medium of claim 10, wherein detecting the status comprises:
    detecting a migration of the source virtualized computing instance associated with the source virtual port from the source host, being a first source host, to a second source host.

14. The non-transitory computer-readable storage medium of claim 13, wherein generating the second instruction comprises:
    generating the second instruction to update the destination session information to replace the first source VTEP address with a second source VTEP address associated with the second source host such that the destination host is able to identify the second source host based on the second source VTEP address.

15. The non-transitory computer-readable storage medium of claim 10, wherein detecting the status comprises at least one of the following:
    detecting a change in a host association status of the source virtual port that indicates a migration of the source virtualized computing instance associated with the source virtual port; and detecting a change in a host association status of the destination virtual port that indicates a migration of the destination virtualized computing instance associated with the destination virtual port.

16. The non-transitory computer-readable storage medium of claim 10, wherein detecting the status comprises:
detecting an inactivity status of the destination virtual port.

17. The non-transitory computer-readable storage medium of claim 16, wherein the method comprises one or more of the following:
generating the first instruction to remove the source session information or set a flag associated with the source session information such that the port mirroring session is disabled at the source host; and
generating the second instruction to remove the destination session information or set a flag associated with the destination source session information such that the port mirroring session is disabled at the destination host.

18. A computer system configured to implement port mirroring in a virtualized computing environment, and the computer system comprises:
a processor; and
a non-transitory computer-readable medium having stored thereon instructions that, when executed by the processor, cause the processor to:
configure a port mirroring session between a source virtual port associated with a source virtualized computing instance supported by a source host and a destination virtual port associated with a destination virtualized computing instance supported by a destination host, wherein the source host is configured using source session information with at least a first destination virtual tunnel endpoint (VTEP) address for the port mirroring session and the destination host is configured using destination session information with at least a first source VTEP address for the port mirroring session such that packets passing through the source virtual port are mirrored and sent from the source host to the destination host, and each mirrored packet in the port mirroring session includes an outer header identifying the source session information and the destination session information and an inner header identifying the source virtualized computing instance and the destination virtualized computing instance; and
in response to detecting a status associated with the source virtual port, or the destination virtual port, that requires a reconfiguration of the port mirroring session,
based on the detected status, generate a first instruction to update the source session information at the source host, or a second instruction to update the destination session information at the destination host, or both; and
send the first instruction to the source host, or the second instruction to the destination host, or both.

19. The computer system of claim 18, wherein the instructions for detecting the status cause the processor to:
detect a migration of the destination virtualized computing instance associated with the destination virtual port from the destination host, being a first destination host, to a second destination host.

20. The computer system of claim 19, wherein the instructions for generating the first instruction cause the processor to:
generate the first instruction to update the source session information to replace the first destination VTEP address with a second destination VTEP address associated with the second destination host such that mirrored packets are sent from the source host to the second destination host based on the second destination VTEP address.

21. The computer system of claim 18, wherein the instructions for detecting the status cause the processor to:
detect a migration of the source virtualized computing instance associated with the source virtual port from the source host, being a first source host, to a second source host.

22. The computer system of claim 21, wherein the instructions for generating the second instruction cause the processor to:
generate the second instruction to update the destination session information to replace the first source VTEP address with a second source VTEP address associated with the second source host such that the destination host is able to identify the second source host based on the second source VTEP address.

23. The computer system of claim 18, wherein the instructions for detecting the status cause the processor to perform at least one of the following:
detect a change in a host association status of the source virtual port that indicates a migration of the source virtualized computing instance associated with the source virtual port; and
detect a change in a host association status of the destination virtual port that indicates a migration of the destination virtualized computing instance associated with the destination virtual port.

24. The computer system of claim 18, wherein the instructions for detecting the status cause the processor to:
detect an inactivity status of the destination virtual port.

25. The computer system of claim 24, wherein the instructions cause the processor to perform one or more of the following:
generate the first instruction to remove the source session information or set a flag associated with the source session information such that the port mirroring session is disabled at the source host; and
generate the second instruction to remove the destination session information or set a flag associated with the destination session information such that the port mirroring session is disabled at the destination host.

* * * * *